D. L. ELLIS.
Machine for Dressing Millstones.

No. 214,638. Patented April 22, 1879.

WITNESSES:
Henry N. Miller
C. Sedgwick

INVENTOR:
D. L. Ellis
BY Munn & Co
ATTORNEYS.

UNITED STATES PATENT OFFICE.

DAVID L. ELLIS, OF HOMER CITY, PENNSYLVANIA.

IMPROVEMENT IN MACHINES FOR DRESSING MILLSTONES.

Specification forming part of Letters Patent No. 214,638, dated April 22, 1879; application filed January 8, 1879.

*To all whom it may concern:*

Be it known that I, DAVID LUMLEY ELLIS, of Homer City, in the county of Indiana and State of Pennsylvania, have invented a new and useful Improvement in Machines for Dressing Millstones.

Figure 1:
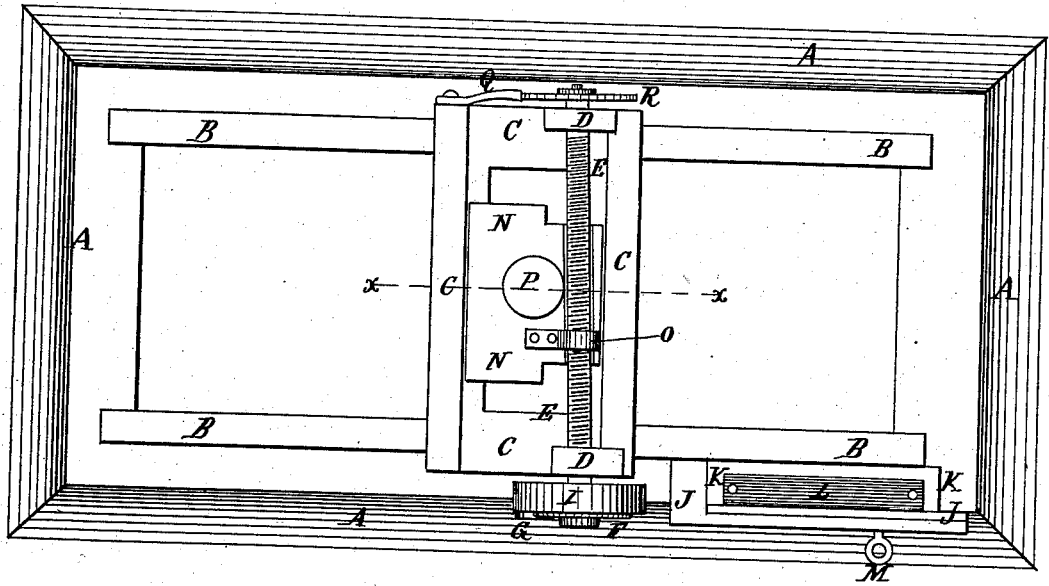
Figure 2:
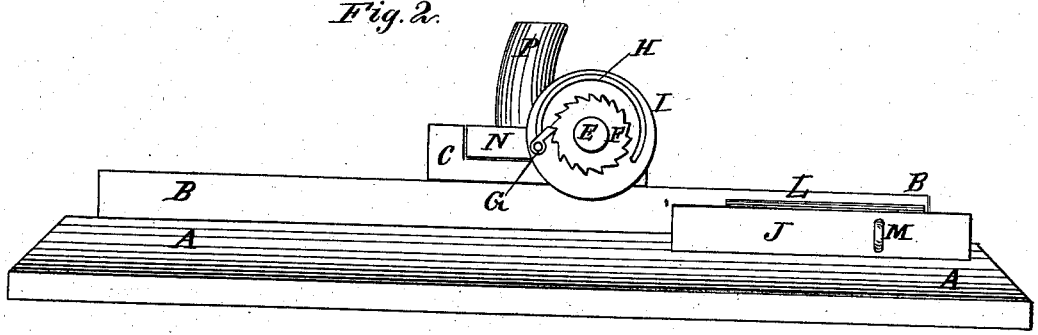
Figure 3:
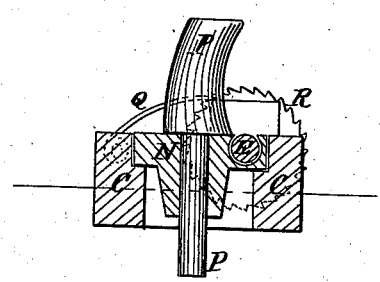

Figure 1 is a top view of my improved machine. Fig. 2 is a side view of the same. Fig. 3 is a detail section taken through the line $x\ x$, Fig. 1.

Similar letters of reference indicate corresponding parts.

The object of this invention is to furnish an improved machine for dressing millstones with a diamond point, which shall be simple in construction, easily operated, and accurate in operation, and which may be adjusted to make the scores or cracks close together or at any desired distance apart.

The invention consists in the combination, in a millstone-dressing machine, of the adjustable slide, provided with the rubber block or strip and the set-screw, with the frame and the wheel connected with the feed-screw.

A is the main frame, the bottom of which is planed true to rest upon the stone to be dressed.

To the upper side of the frame A are attached bars B, to serve as a track for the carriage C to slide back and forth upon. The upper sides of the track B are planed true, so that they may be parallel with the bottom of the frame A.

To the ends of the carriage C are attached bearing-blocks D, to which is swiveled a screw, E. To one end of the screw E is attached a ratchet-wheel, F, with the teeth of which engages a pawl, G, which is held down upon the said teeth by the spring H, and is pivoted to the side of the wheel I. The wheel I runs loosely upon the screw E at the inner side of the ratchet-wheel F.

To one of the side bars of the frame A, near its rear end, is attached a case, J, within which is placed a slide, K, having a block or strip, L, of rubber, let into and secured to it.

The slide K is secured in place when adjusted by a set-screw, M, passing in through the side of the case J and resting against the side of the slide K. Upon the carriage C rests and slides a block, N, to which is attached a nut, O, through which the screw E passes, so that the slide N may be moved back and forth upon the carriage C by the revolution of the screw E.

Through the middle part of the slide N is passed the stem or holder P, to the lower end of which the diamond point is designed to be attached, and the upper part of which serves as a handle for operating the machine. With this construction, when the carriage C is drawn back after making a cut, and the wheel I comes in contact with the slide K L, the said wheel is revolved, causing the pawl and ratchet wheel G H F to turn the screw E and move the slide N and the holder P to one side (less or more) according to the adjustment of the slide K L, so as to make the scores or cracks closer together or farther apart, as may be desired.

The screw E is kept from being turned by the forward movement of the wheel I upon the slide K L by the pawl Q, pivoted to the carriage C, and which engages with the teeth of the ratchet-wheel R, attached to the other end of the said screw E.

I am aware that the slide to which the diamond-holder is attached has been operated by a feed-screw, so as to make the scores or cracks farther apart or closer together, as may be desired; but

What I claim, and desire to secure by Letters Patent, is—

The combination, in a millstone-dressing machine, of the case J, the adjustable slide K, provided with the rubber block or strip L, and the set-screw M with the frame A and the wheel I, connected with the feed-screw E, substantially as herein shown and described.

DAVID LUMLEY ELLIS.

Witnesses:
WM. MCKESSON,
G. H. OGDEN.